United States Patent [19]

Goode et al.

[11] 4,397,007

[45] Aug. 2, 1983

[54] REAL-TIME MONITOR FOR MARINE SEISMIC EXPLORATION SYSTEM

[75] Inventors: James W. Goode, Dallas; Thomas F. Crandell, Carrollton, both of Tex.

[73] Assignee: Mobil Oil Corporation, New York, N.Y.

[21] Appl. No.: 118,162

[22] Filed: Feb. 4, 1980

[51] Int. Cl.$^3$ .......................... G01V 1/24; G01V 1/34
[52] U.S. Cl. ........................................ 367/68; 367/74
[58] Field of Search ...................... 367/68, 69, 70, 71, 367/74

[56] References Cited

U.S. PATENT DOCUMENTS

| | | | |
|---|---|---|---|
| 2,939,107 | 5/1960 | Ball | 367/68 |
| 3,784,967 | 1/1974 | Graul | 367/68 |
| 4,016,531 | 4/1977 | Cook et al. | 367/74 |
| 4,228,529 | 10/1980 | Hsu et al. | 367/68 |
| 4,229,810 | 10/1980 | Thompson | 367/68 |
| 4,257,098 | 3/1981 | Lacy | 364/200 |

*Primary Examiner*—Nelson Moskowitz
*Attorney, Agent, or Firm*—Charles A. Huggett; Michael C. Gilman; Frank J. Kowalski

[57] ABSTRACT

A real-time monitor which displays analog representations of digital seismic data having been recorded on magnetic tape such that adjacent seismic traces are partially overlapped, whereby the appearance of an error is enhanced and is disclosed. The monitor display is controlled by a computer which may be of a type similar to computers used in the seismic data storage system for other purposes so that it may serve as a backup computer. This system is implemented by incorporating into magnetic tape data storage drives read-after-write circuitry so that the data put on the tape can be read off the tape immediately thereafter and used to control the monitor means. In this way, the monitor is in fact operating in real-time and operates on precisely that data which in on the tape; thus any errors displayed on the real-time monitor include any errors made in the actual recordation of the data onto magnetic tape.

2 Claims, 11 Drawing Figures n=11; ZERO VALUE, $\frac{n+1}{2}$=6; NO OVERLAP n=9; ZERO VALUE, $\frac{n+1}{2}$=5; HALF-WAVE OVERLAP, p=2; OVERLAPPED BY $\frac{n-1}{p}$ = 4-ROWS n=15; ZERO VALUE, $\frac{n+1}{2}$=8; THIRD-WAVE OVERLAP, P=3 OVERLAPPED BY $\frac{n-1}{p} \simeq$ 4 ROWS;

FILLED IN BETWEEN $\frac{n+1}{2}$ AND MAXIMUM VALUE FOR CLARITY.

Fig. 5(A)  $n=11$; ZERO VALUE, $\frac{n+1}{2}=6$; NO OVERLAP

Fig. 5(B)  $n=9$; ZERO VALUE, $\frac{n+1}{2}=5$; HALF-WAVE OVERLAP, $p=2$; OVERLAPPED BY $\frac{n-1}{p}=4$-ROWS

Fig. 5(C)

$n=15$; ZERO VALUE, $\frac{n+1}{2}=8$; THIRD-WAVE OVERLAP, $P=3$ OVERLAPPED BY $\frac{n-1}{P} \simeq 4$ ROWS; FILLED IN BETWEEN $\frac{n+1}{2}$ AND MAXIMUM VALUE FOR CLARITY.

REAL-TIME MONITOR FOR MARINE SEISMIC EXPLORATION SYSTEM

FIELD OF THE INVENTION

This invention relates to the field of data processing in which a monitor provides a real-time indication of the data being stored on magnetic tape after processing operations have been performed thereon. The invention relates to a real-time monitor suitable for use in seismic exploration data processing systems.

BACKGROUND OF THE INVENTION

It has become increasingly popular in recent years to perform geo-physical exploration in order to search for subterranean formations known to be indicative of the possible presence of gas or oil. In seismic exploration, an acoustic wave is propagated through the earth and is reflected from interfaces between subterranean layers. The time taken for the reflected wave to return to its source, or to a geophone placed nearby, is indicative of the depth to which the wave travelled before reflection and can therefore be used to derive an indication of the subterranean structure. If a number of parallel measurements are made, the subterranean structure can therefore be charted. Similar techniques may be used on land, or at sea, depending on where the exploration is is being carried out.

The development of useful pictures of the underground formation from geophonic records of the propagation or reflection of acoustic waves involves a great deal of skill, particularly inasmuch as the waves frequently must travel great distances before returning to a geophone. Therefore, they are very much susceptible to electronic and acoustic noise and must be very carefully processed in order to yield significant results.

Increasing the number of geophones "listening" to a given seismic impulse being reflected from subterranean formations increases the amount of data available to be processed. The prior art describes increasing the number of geophones, the number of data recording devices, and the resulting number of seismograms in seismic exploration. Numerous inventions have been made in order to permit such expansion of the data base available to the geophysicist for interpretation. Some of the expedients used are described in commonly assigned U.S. Pat. Nos. 4,016,531 and 4,084,151 as well as in commonly assigned co-pending application Ser. No. 118,299, filed Feb. 4, 1980, now U.S. Pat. No. 4,323,990. The goal of all three of the inventions described by these disclosures is to perform additional data processing on the data while it is still being stored on an ocean-going exploration vessel. This places the seismic data in a format in which it can be most efficiently transported to and processed on the land based computer which is designed to remove noise and to produce accurate pictures of subterranean formations for geophysical use. The better the condition of the data while still on board the vessel, the better the results will be from the land based computer. The present invention is concerned with means for improving these results and comprises a real-time monitor which gives an approximate picture of the data as it is being recorded. From this, the operator of the seismic exploration system can determine if the system is functioning properly, and can accordingly make corrections.

Seismic exploration for oil and gas frequently involves the use of a specially constructed seismic exploration vessel. This vessel produces acoustic impulses from compressed air guns which are towed by the vessel. These guns are filled with compressed air at very high pressure which is rapidly released into the water, thus sending a sonic wave through the water. This wave passes through the sea and through the sea bed and is partially reflected at the interface between each layer of differing density; thus, a large fraction of the wave is reflected at the sea bottom, and further fractions are reflected at the first interface between one type of layer under the sea and a second type, and so on until the wave is dissipated. Behind the boat is streamed a long cable having a large number of acoustic energy detectors streamed therefrom. These acoustic energy detectors may comprise piezoelectric hydrophones. These are, in turn, connected to circuitry for converting the analog wave forms ("traces") produced by the seismic energy detectors into digital data suitable for processing by computer to yield a picture of the subsea bed. In the preferred embodiment to be described more fully hereinafter, 208 hydrophone traces are used. The acoustic waveform represented by each trace is sampled every four milliseconds and used to produce a digital representation of its instantaneous amplitude. The words of digital data thus produced, it will be apparent, will be produced in the order of the time of sampling; that is, they will be serial by time of detection. It is useful in the eventual computation to be performed on this data that the data be serial by trace; that is, it is desirable that all the data from a given trace be stored on magnetic tape first, then all the data from a second trace, and so on. Therefore on-board processing means are provided to re-format this data into a second format in which it is desired to be presented to a land based computer.

It is desirable that the operation of these reformatting means, which may comprise a plurality of computers, as well as interface means and other well known data processing means, be monitored in real-time; that is, while the reformatting is going on. The present invention is directed at this point and comprises real-time monitor means for producing a visual record on paper (i.e. a hard copy) of the data as it is stored on magnetic tape in the form in which it is desired to present it to a land based computer for analysis and study.

It will be appreciated that a vast quantity of data is generated in the process as described above. Indeed, an entire reel of magnetic tape is completely filled with data generated in this fashion in approximately eleven minutes according to the system as described above. Likewise, it would be appreciated that a similarly vast amount of data must be monitored by the monitor means. Therefore, it is desirable to provide means for making this data more clearly interpretable by the eye so that any errors in the recording process could be better detected. Any deficiencies of the display means chosen to show the real-time picture of the data being stored should be overcome. For example, traces of the analog wave forms produced at the geophones appear as sinusoidal type waves, although, of course, not of perfect sine wave shape. If a large quantity of these waves are reproduced on a single sheet of paper by a monitor plotter, they tend to be rather small and indistinct from one another, since so much data is being compressed and displayed on a single sheet of paper. It has been found by applicants that by partially overlapping successive traces and filling-in the positive portion of the graphed wave shape, the data is made much more clearly readable, and errors are significantly better detectable. A similar situation would prevail if the data were being displayed on a cathode ray tube such as a TV or oscilloscope screen, rather than on a piece of paper, and this discovery has utility there as well.

Clearly, it would be advantageous to provide monitor means at reasonable cost and of high efficiency. Specifically, it is desirable that the computer used to generate the display be similar to those used to reformat the data, so that similar software may be employed and so that the monitor computer can serve as a back-up to the reformatting computer(s).

OBJECTS OF THE INVENTION

It is therefore an object of the invention to provide real-time monitor means for seismic data storage applications.

It is a further object of the invention to provide real-time monitor means for seismic exploration whereby defects in the storage of data corresponding to seismic signals can be identified.

A further object of the invention is to provide a real-time monitor having display means the display of which is enhanced in order to promote the effective comprehension of the display by an operator.

Yet a further object of the invention is to provide a real-time monitor in which seismic data is displayed in a manner such as to emphasize the appearance of errors in such data.

Still a further object of the invention is to provide a seismic data storage monitor system in which the computer chosen for display preparation is compatible with those used for the system functions, so that it can serve as a back-up computer.

SUMMARY OF THE INVENTION

The above objects of the invention and needs of the art are satisfied by the present invention which comprises a real-time monitor which displays analog representations of digital seismic data having been recorded on magnetic tape such that adjacent seismic traces are partially overlapped, whereby the appearance of an error is enhanced. The monitor display is controlled by a computer which may be of a type similar to computers used in the seismic data storage system for other purposes so that it may serve as a back-up computer. This system is implemented by incorporating into magnetic tape data storage drives read after write circuitry so that the data put on the tape can be read off the tape immediately thereafter and used to control the monitor means. In this way, the monitor is in fact operating in real-time and operates on precisely that data which is on the tape; thus any errors displayed on the real-time monitor include any errors made in the actual recordation of the data onto magnetic tape.

BRIEF DESCRIPTION OF THE DRAWING

The invention will be better understood if reference is made to the accompanying drawing in which.

DESCRIPTION OF THE PREFERRED EMBODIMENTS

Figure 1:
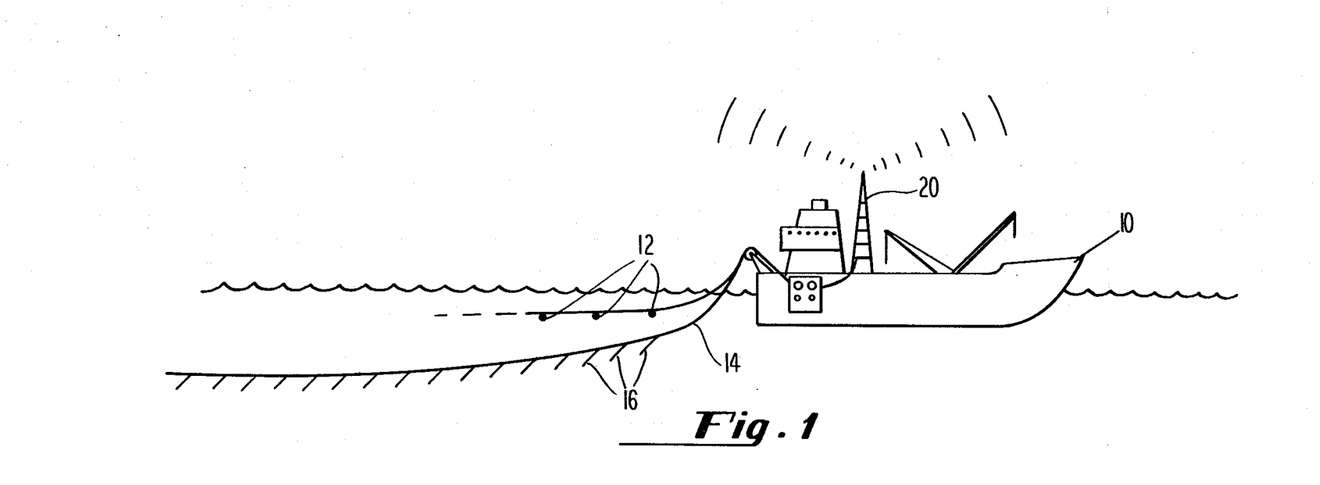
FIG. 1 represents an overview of the seismic exploration system including a vessel and a streamer of geophones.

Referring now to FIG. 1, an overview of a seismic data detection and recordation system according to the invention is shown. This system comprises an exploration vessel 10 provided with a number (in a preferred embodiment 40) of compressed air guns 12 which are charged with compressed air to a high pressure and are rapidly released into the water, thus generating an acoustic wave. The reflected waves are detected by a plurality of hydrophones 16 streamed from the stern of the vessel by cable 14. By measuring the time taken for the wave to travel through the sea, through the subsurface, be reflected and return through the subsurface and the sea to the hydrophones, the depth of the interfaces in the subsurface can be determined. By steaming the boat back and forth in parallel lines and taking corresponding measurements, the entire three dimensional picture of the interfaces between layers of varying densities under the sea can thus be depicted. Since certain types of subsea structures, most notably domes, are known to be likely to contain oil and gas, this seismic information can therefore be used in the search of gas and oil.

What is detected, therefore, by the hydrophones 16 is a reflected acoustic pressure wave. As the hydrophones 16 are peizoelectric microphones essentially, they produce a voltage in response to pressure applied thereon. This analog voltage signal is carried via cable 14 to computing and storage equipment 18 in the vessel 10. At the time, navigational information from shore-based radio stations and from satellites is received by an antenna 20 and is also stored in data computational and recording equipment 18. This information, together with other information used to identify the parameters under which the seismic data is taken, is used to generate a "header" which forms the beginning of each record of seismic data on a tape; the header may in fact be printed out on the monitor in order to help identify the source of any errors or to clarify the circumstances under which the data was taken. The process of generating these headers is more fully described in co-pending application Ser. No. 118,299, filed Feb. 4, 1980, now U.S. Pat. No. 4,323,990.

Figure 2:
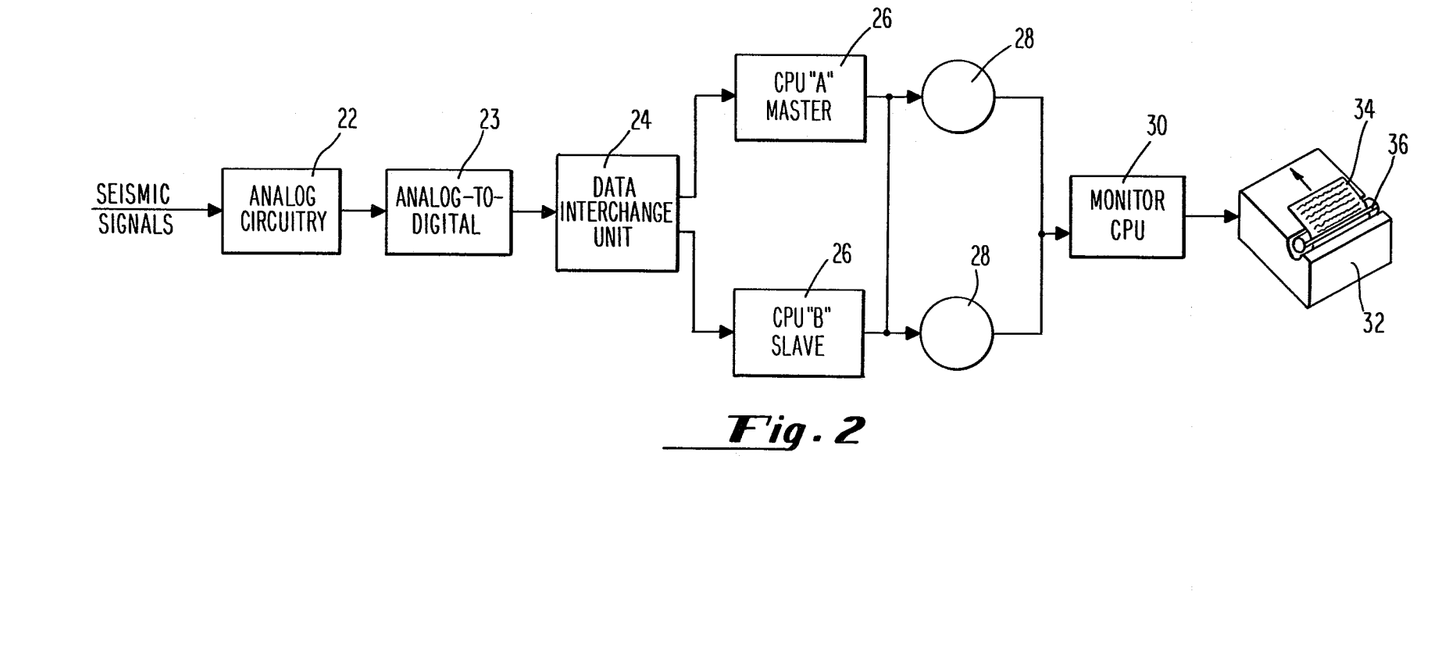
FIG. 2 represents a block diagram of the overall seismic data detection and recordation system according to the invention.

Referring now to FIG. 2, a block diagram view of the data processing and storage system according to the invention is shown. Seismic signals from geophones 16 in FIG. 1 are shown being brought into analog circuitry 22. This circuitry can comprise various well-known expedients for analog signal processing; for example, impedance matching of the signals derived from various locations along the streamer 14 is generally performed, as well as filtering and amplification. The signals are then converted into digital signals in an analog to digital converter 23. In the preferred embodiment, each of the incoming seismic signals are sampled at regular intervals of time, at which the instantaneous signal amplitude is converted into a digital representation thereof. Thus, a series of digital samples are produced, each of which corresponds to the instantaneous amplitude of a different signal. The digital samples thus produced are multiplexed signals in the sense that they come from a variety of sources and are serial by time of detection. As discussed above, it is desirable for reasons of processing efficiency that the digital signals presented to land based computers be serial by trace; that is, that the digital representations of the instantaneous signal voltage samples of a given hydrophone all be collected together. Therefore, the data is demultiplexed into a serial by trace form, rather than serial by time of detection. In order to achieve this end, alternating ones of the digital signals are respectively selected by ones of two or more central processing units (CPU's) 26. In a preferred embodiment one of the CPU's 26 is a master and the remainder slaves; that is, the CPU's 26 may be essentially similar units all being controlled by the same programming information contained in the respective memory banks of each computer. In this way, the system can be readily expanded to handle increasing amounts of data. This arrangement has additional advantages that will be explained in detail hereinafter. From the CPU's 26, the data is then passed to magnetic tape storage devices 28 where the data is permanently stored on reels of magnetic tape, which are then ready for computation and analysis to be performed thereon on a shore-based computer.

From the tape storage units 28, signals are then passed by means of read-after-write circuitry to a monitor CPU 30 where the monitor display is generated. The display control signals are then passed to a display unit 32 which may be a conventional electrostatic chart recorder which produces symbols on a sheet of paper 34 by means of a stylus 36 in accordance with the digital data being stored on the tape reels 28.

In a preferred embodiment, the monitor CPU 30, in which the digital data stored on the tapes 28 is converted into a form suitable for display by a monitor display unit 32, is of the same type as the two or more CPU's 26 used to reformat the data into the format on which it is stored on tape, so that in the event that one of the CPU's 26 breaks down, the monitor CPU 30 can be diverted from its primary task and be pressed into service in place of one of the CPU's 26. Furthermore, by making all three CPU's essentially the same, they "speak the same language" and less interface complexity is required. In a preferred embodiment, the master CPU, all slave CPU's, and the monitor CPU are all Texas Instrument Model No. 980B computers.

The monitor means 32, while depicted in FIG. 2 as a chart recorder, could be any one of a wide variety of printers or other output means, including cathode ray tubes. In a preferred embodiment, an electrostatic printer sold by the Versatec Company under Model No. D2030/A is used. This unit produces a marking on a sheet of paper by impressing an electric charge on the paper at the point where a mark is desired, and passing it through a conductive ink comprising carbon particles in a solvent base. The ink is attracted to the charged area and the solvent then evaporates, leaving the carbon on the paper. The advantage of this type of printer is that the electrodes putting the voltage on the paper can be very closely spaced, thus allowing very good definition. The particular printer described is capable of printing 100 dots per inch in orthogonal directions, thus allowing very fine printing. This is useful in the present embodiment because, as discussed above, a vast quantity of data must be shown on the monitor means. In a typical seismic "shot", 208 traces are each sampled 250 times per second for approximately six seconds, producing 1500 words of digital data per trace, or some 312,000 words of data per shot. Each of these words of data can be represented on the chart described above as an individual dot, thus permitting the complete graphing of all the digital data gathered in a specific seismic shot. More specifically, as the chart paper 34 passes beneath the stylus 36, dots are impressed in a number of rows corresponding to the total number of samplings of each individual trace. For example, in a six second shot, each trace would be sampled 1500 times, and 1500 dots would be produced on each line produced on the paper 34 by the stylus 36. The direction of travel of the paper, which is indicated in FIG. 2 by an arrow, represents the correspondence to the trace position along the streamer 14, so that the output of the trace farthest from the vessel 10 would be printed out first, then that next closest, and so on.

Not shown in the system of FIG. 2, but a part of it are additional means more fully described in co-pending application, Ser. No. 118,299, filed Feb. 4, 1980, now U.S. Pat. No. 4,323,990. Specifically, the system also includes magnetic disk media for temporary storage of data for processing purposes in real-time; that is, a plurality of magnetic disk units are connected by means of a multi-disk transfer switch to the CPU's 26 and 30 of the system. Such magnetic disks are used for temporary storage of data by all the CPU's. Long-term storage of data is done on the magnetic tapes recorded on the magnetic tape drive units 28, magnetic disk units being far too expensive for such large volume storage over a long period of time.

Figure 3:
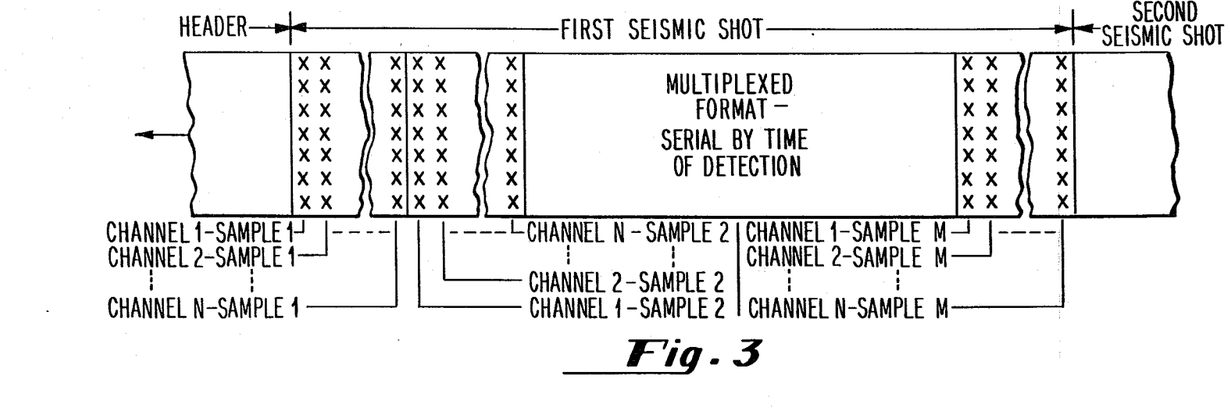
FIG. 3 shows the multiplexed format in which data is initially generated.
Figure 4:
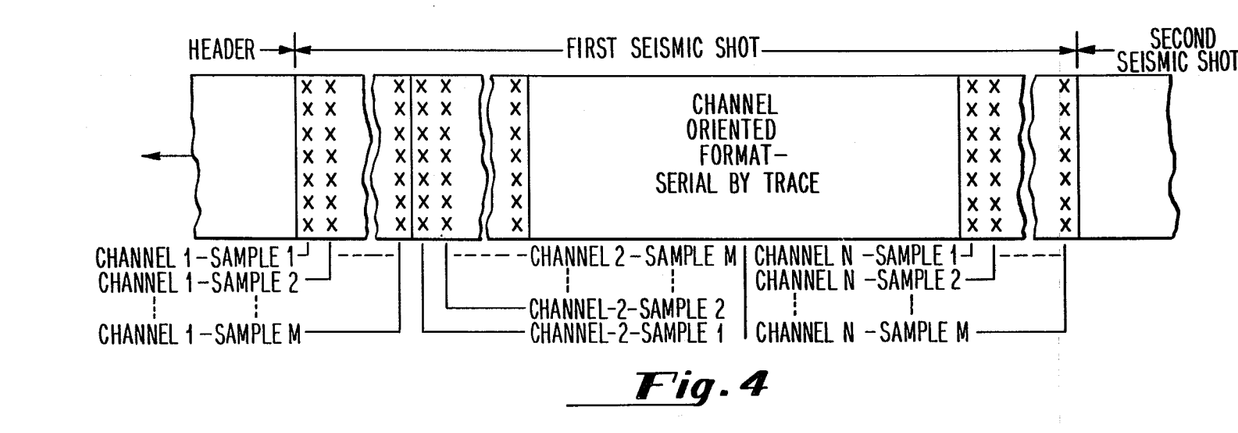
FIG. 4 shows the channel-oriented format to which the data is rearranged by computers on board the vessel for more economic processing at a later time.

Referring now to FIG. 3, a digital record is shown in the format in which it is supplied to the data interchange unit 24. The area indicated "first seismic shot", it will be seen, is divided into a number of samples running from 1 through M. In the circumstance where each trace is sampled 250 times per second for six second, M would therefore be 1500. The channels run from 1 through N; in the preferred embodiment where 208 traces make up the streamer, N would then, of course, be 208. The rows of vertical X's in the figure each represent one digital word, or the digital representation of a single instantaneous measurement of the amplitude of an analog signal at a trace. It will be observed that these digital words are organized in a serial by time of detection format; that is, the first trace sampled makes up the first record (Channel 1—Sample 1), the second trace is then sampled, making the second record (Channel 2—Sample 1), and so forth until all traces have been sampled once (Channel N—Sample 1). The apparatus then moves back to the first channel and samples it for the second time (Channel 1—Sample 2), then samples the second channel for the second time (Channel 2—Sample 2) and so on until all the channels have been sampled twice (Channel N—Sample 2), and so on until all channels have been sampled the predetermined number of times M (Channel N—Sample M). As discussed above, the land-based computers which perform the ultimate analysis of the seismic data thus recorded can operate more efficiently if they are presented with the data organized so that all the data collected from given hydrophones (i.e. each trace) is provided to them at once; that is, all the words relating to a given channel are presented at one time. Therefore, CPU's 26 are provided to reorganize the multiplexed format data, serial by time of detection shown in FIG. 3, into a channel-oriented format, serial by trace, as shown in FIG. 4. Here it will be observed that first are given the 1 through M samples of channel 1, then the 1 through M samples of channel 2, and so on until channel N is reached, which concludes with the Mth sample of the Nth channel.

In both FIGS. 3 and 4, the data is preceded by a header which is generated as discussed above by combining the navigational, temporal and spatial information relating to the shot in a header of predetermined format so as to enable the identification of each record by means of its magnetic tape. This header information is assembled in a data interchange unit 24 which is more fully discussed in co-pending application Ser. No. 118,299, filed Feb. 4, 1980, now U.S. Pat. No. 4,323,990. This header information thus becomes a part of the record on the magnetic tape and can be printed out on monitor means 32 using means well known in the art for converting digital data into alphanumeric symbols.

The channel-oriented format shown in FIG. 4 is that in which the digital records eventually are stored on magnetic tape at tape transports 28. If the real-time monitor of the invention is to operate upon this data, in order to display an analog representation of the digital data stored on the tape, clearly it would be simpler to use this data in the order in which it is presented, i.e. serial by trace, rather than reorganize it into a multiplexed format as in FIG. 3. However, the invention has applicability to both data formats as will be explained in further detail below.

Figure 5A:
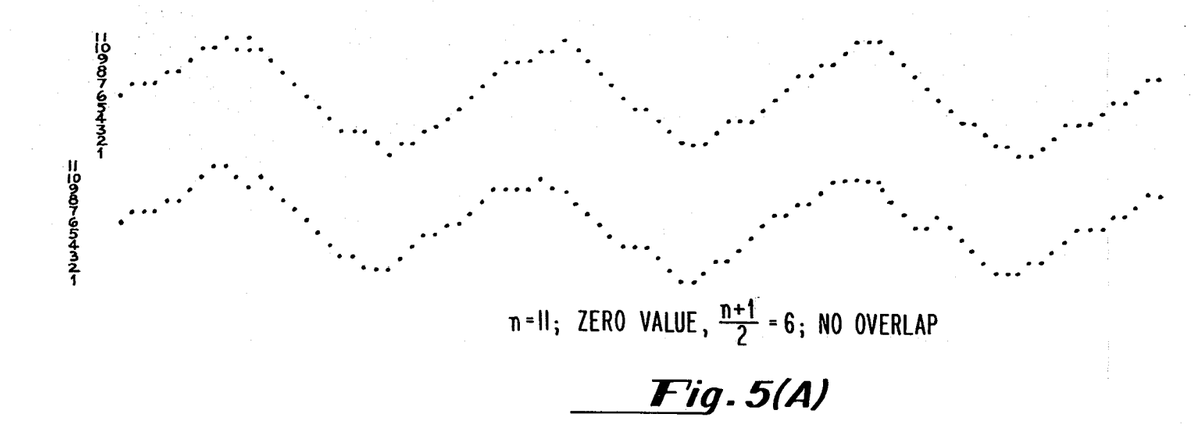
FIGS. 5A, B, and C show methods of arranging a raster memory in order to print out data on a real-time monitor.
Figure 5B:
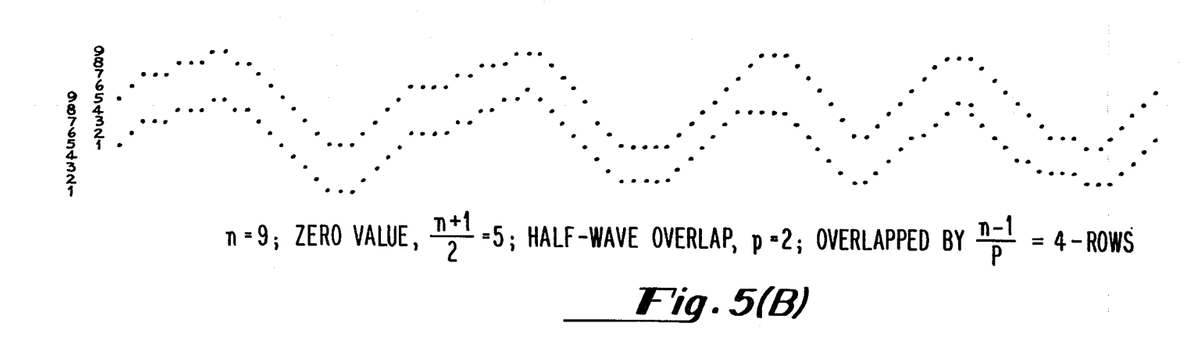
Figure 5C:
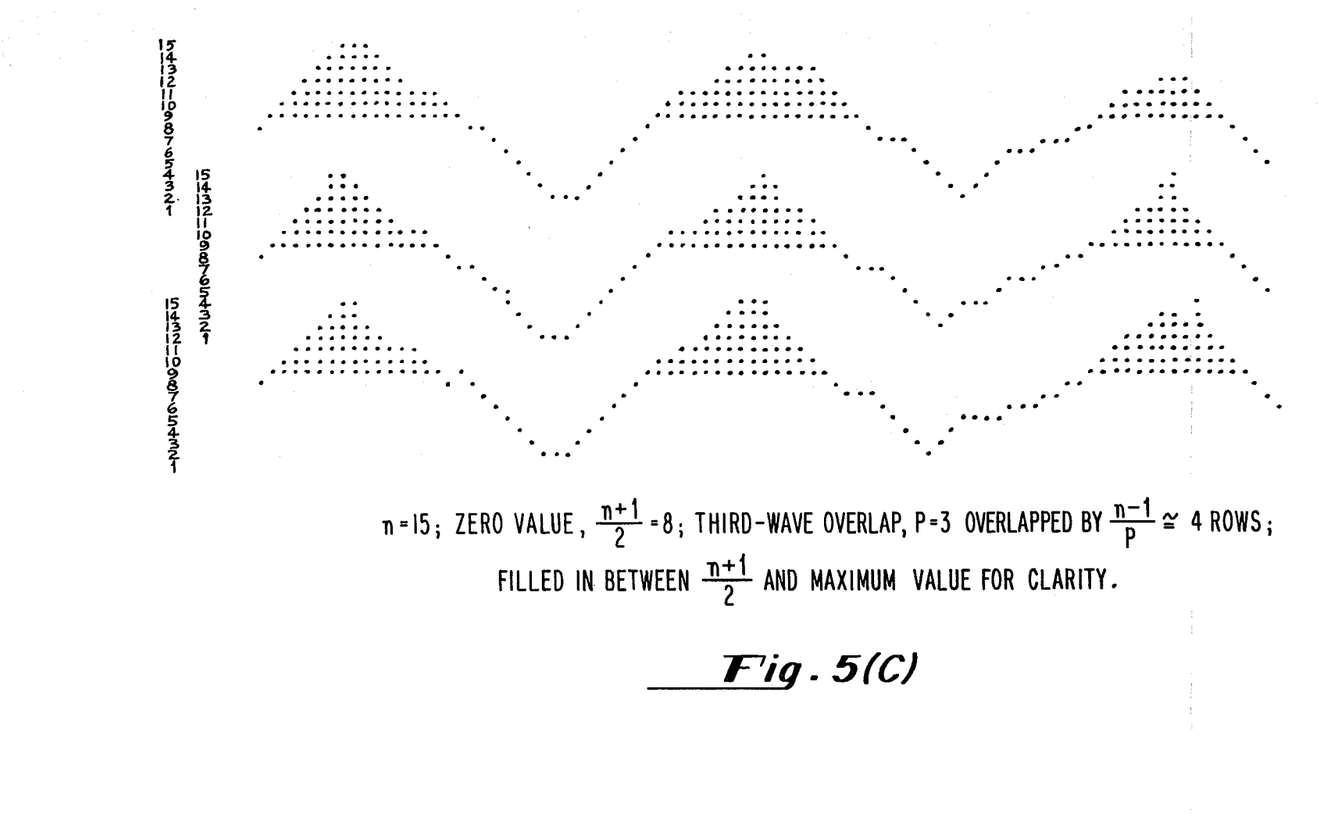

As discussed above, it has been found by the applicants that the clarity of presentation of graphical data can be improved by first overlapping the sequential traces so that they are physically closer together on a display medium, and second by filling-in either the positive or negative portions of a generally sinusoidal wave shape, so as to emphasize this half of the wave. It has been found that this is particularly of use in seismic data processing monitoring applications where a vast quantity of data is being generated at all times, and any errors, to be detected in time for their solution, must be readily apparent to the operator of the seismic exploration vessel. Reference to FIGS. 5A through C will make these distinctions clear. In FIG. 5A are shown two substantially similar wave shapes which are not overlapped, and which are not filled in. It is believed to be clear from the Figure that it is not easy to compare these two wave shapes to determine at a glance where they differ. It is even more difficult to determine the differences where the waves are of a much smaller overall size, as is the case in the monitor system according to the invention, in which they also extend over a much wider display means, and in which the dots making up the wave shape are much closer together. FIG. 5B shows overlapping wave shapes. By the addition of this expedient, the waves can be much more readily compared, and it can be seen that they are, in fact, almost identical in the Figure as drawn. Finally, in FIG. 5C, the waves are shown overlapped, although not to the extent they are overlapped in FIG. 5B, and also have their positive halves filled in with additional dots. These waves can be far more easily compared with one another than those shown in FIG. 5A, and there is also improvement over the waves shown in FIG. 5B. Therefore, it is seen from a comparison of these figures how helpful these overlapping and filling-in expedients can be.

There are a number of different ways of generating graphic displays from digital data contained in a computer memory system. Perhaps the most common of these methods is that in which an array is set up corresponding in either length or width or both to the length or width, respectively, of the desired display. The array is then filled cell by cell with printing instructions corresponding to the data to be graphed. The array is then fed line by line to a printer or cathode-ray tube, or other display means resulting in the displaying of a graph of an output corresponding to the data fed in. Clearly, certain steps must be taken prior to the filling of the array with display instructions, such as scaling the data to be graphed so that the amplitude of the points being stored in the array do not exceed the maximum array amplitude. Further, it will be appreciated that the array may comprise but a single row of storage locations, or may comprise an N by M array equal in size to the total of the display. In the first case, of course, processing would be performed line by line, and the display instructions inserted in the array accordingly. In the second, it would usually be simpler to fill the entire array with all display instructions prior to printing any of the display.

The present monitor means utilizes in a preferred embodiment a hybrid scheme whereby only part of the data to be graphed is operated upon to generate display instructions at any one time, and these display instructions are then acted on and the total display partially generated, prior to operation on the next set of data. In particular, the array is open-ended in one dimension; that is, a first trace or plurality of traces is graphed, then a new one or ones of data records corresponding to one or more traces is brought into the processor and used to generate further data instructions, is then printed, and so on. The width of the array, in a preferred embodiment, is equal to the total number of samples taken for each trace, typically between 1500 and 2000 samples per shot, and is deep enough to allow the overlapping graphing of up to three traces, which may require that the array be up to approximately 200 cells deep for storage of display instructions. In this way, depending on the maximum amplitude of the traces, display instructions corresponding to five traces can be simultaneously processed in the array so as to allow overlapping of the traces and simultaneous printing of several traces. In this way, the traces can be printed overlapping which, as discussed above, is of great benefit in determining the presence of recurring errors in the data.

It will be appreciated by those skilled in the art that the proper scaling to be applied to the data depends on the maximum amplitude selected for the graphed data. Referring now to FIGS. 5A through C, different scale factors are shown. For example, in FIG. 5A, the maximum amplitude in either the plus or minus direction of the trace is 5, so a total of 11 cells in the vertical direction are required to contain printing instructions, that is 5 positive, 5 negative, and 1 zero. In FIG. 5B, nine cells are required per trace, 4 positive, 4 negative and 1 zero, and in FIG. 5C, 15 are required, 7 positive, 7 negative, and 1 zero. Of course, it will be appreciated that the number of cells could be made an even number by deleting the zero position. In the preferred embodiment, the operator of the monitor system of the invention has the option of selecting a maximum amplitude of between 5 and 31. Therefore, each trace can take up between 11 and 63 cells in the vertical direction. The scaling of the data is performed accordingly, of course, so that the maximum analog voltage produced by a trace corresponds to the selected maximum display amplitude.

Given the above, it will be understood how in general a graph corresponding to FIG. 5A may be generated. Each individual data point is multiplied by a scale factor and converted to an integer number, so as to provide a whole number representation of the amplitude of the data at a given point. A display instruction corresponding to that point is then placed in the appropriate cell of the array, and the following data point is then operated upon. If the printer is such that the paper moves with respect to the printing means in the vertical direction with respect to FIG. 5A, the entire trace will first be converted to data instructions and stored in the array before any printing is performed. The printing may then be performed a line at a time, for however many lines as are required to display all points of the array; then, the next trace is operated on in a similar fashion.

The improvement made by the present invention includes the fact that rather than calculating the scale factor to apply to an entire trace, filling the array with display instructions accordingly, and operating display means in accordance therewith, successive traces are instead calculated and display instructions generated in response thereto before the first is fully graphed. Thus, in FIG. 5B an overlap is provided between the first and second traces. Clearly, to do so, the printer must be operated in response to the display instructions generated using the data of several traces simultaneously; the particular amount of overlap selected is desirably at the option of the operator. In FIG. 5B, a half wave overlap is shown; that is to say, the scaling and the overlap value are selected such that the maximum amplitude of the second trace is graphed at a level equal to the zero point of the first trace. An integer figure P can be used to indicate this, the amount of overlap; for example in a half-wave overlap, P would be equal to 2; if the overlap was equal to $\frac{1}{3}$, P would be equal to 3. The number of rows of the array required to provide such an overlap is equal to the total number of rows N minus 1 (1 corresponding to the zero point) divided by P and rounded to the nearest integer. Thus, for example, if N were equal to 29 and a third-wave overlap were desired, N minus 1, divided by P, rounded off would be ($29\frac{1}{3}$) nine rows. The operation of a real time monitor in accordance with this invention then will be clear to those skilled in the art. To initialize the display of a given shot, the number of traces possibly called for by the desired parameters are brought in; that is, if the scaling and overlap selected were such that as many as five traces might overlap (i.e. P=1/5), five traces would be operated on at once to initialize the display. Such a large overlap might occur where a considerable amount of noise is present in the signal, but more commonly the amplitude of genuinely echoed signals is higher than that of the noise; in such a case, it might be desirable to have the high amplitude traces overlap as many as four or five preceding and succeeding traces, so as to make the distinction between noise and signal more clearly visible. Since the reflected waves are limited in number such a large overlap does not render the display illegible. Thus, a corresponding number of traces would be brought into the monitor computer 30 (FIG. 2) and scaled accordingly. The array would be filled with the scaled traces, and once a number of rows of the array had been filled corresponding to the maximum possible scale amplitude, printing of the display could begin. Ordinarily, a number of rows corresponding to the number of rows between successive traces would then be printed, at which time the next trace would then be brought into the monitor computer 30 and operated upon similarly. Thus the array could be considered to be a rollover type array where the number of rows corresponding to the distance between zero lines of successive traces are first printed, the following traces then being moved up an equal number of rows to fill the array, thus emptying an equal number of rows at the bottom of the array for the insertion of data corresponding to a new trace. This process would be repeated until the last few traces had been reached, at which time the array would progressively move upwards without further data filling-in at its lower edge.

It will be understood that the foregoing is essentially a description of a so-called raster array which could be used to drive, in well known fashion, a cathode ray tube, television screen, or the like in addition to a hard copy printer. Specifically, the display instructions could correspond to either electronic means for producing a visual image on a screen or could correspond to instructions for energizing an electrode, thus producing a mark on an electrostatic paper. Other copy means are, of course, similarly utilizable.

In connection with FIG. 5C, a further preferred embodiment on the invention is shown. There the positive half sides of succeeding traces have been filled in with dots. This, it has been found, makes the display still more easy to interpret. Evidently when traces made up of a series of dots on a piece of paper are produced, the eye does do not tend to see them as traces, but rather as disconnected dots. By filling the positive (or, presumably, the negative) half-cycle of the data it has been found that trends in the data indicating errors in the recording apparatus are more easily made clear. In a preferred embodiment, the traces are filled-in between the first row above the zero-value row, that is between row $(N+1)/2$, and the maximum value reached in each column. Thus, in FIG. 5C, wherein N is 15, the zero value row is number $(N+1)/2$ or 8, so that the filling-in would be done between row 9 and the maximum value reached in each column, when that value is positive.

It was discussed above that the seismic data storage system within which the invention comprises a preferred monitor means initially detects and temporarily stores data in a multiplexed format, serial by the time of detection as shown in FIG. 3 and later transforms it into a final format, more suitable for storage on magnetic tape drives and for later processing on a land based computer, a channel oriented format which is serial by trace and shown in FIG. 4. Naturally, it is desirable that the real time monitor be placed as far into the on-vessel system as possible, since in that way the maximum amount of equipment on the vessel can be monitored. However, in some circumstances, it may be desirable to monitor the processing of the data at some earlier time prior to its being reformatted into the channel oriented format of FIG. 4. Therefore, means would have to be found for providing a display of the data while in a multiplexed format. In such case, it would still be useful to provide the overlapping traces and filled-in traces discussed above in connection with FIGS. 5B and 5C, respectively. Means whereby this desired object may be obtained will now be described in connection with FIGS. 6A and B.

Figure 6A:
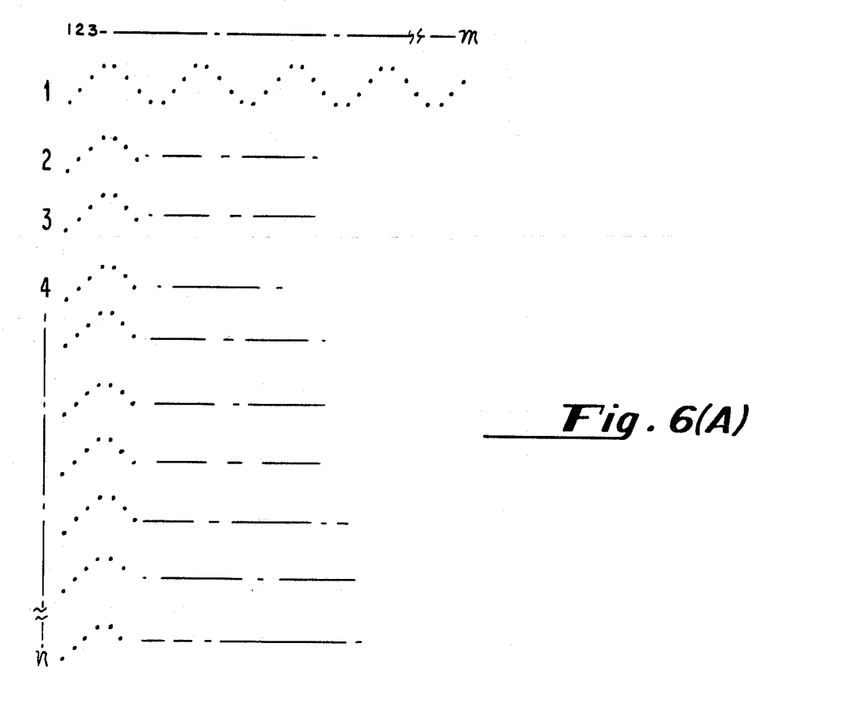
FIGS. 6A and 6B show alternate methods of organizing such a raster for the printing out of digital data corresponding to seismic input according to the invention.

As discussed above, the generation of a visual display of digital data generally involves the filling of an array with display instructions. The array may be of a fixed size, or may be open-ended. The present invention involves an array which is of a "revolving" sort. Display instructions are stored therein and are dealt with in blocks corresponding to the spacing between successive overlapped traces. If the array is characterized as being N rows high by M columns wide, M would correspond to the total number of samples taken out of each trace, whereas N would correspond to the total number of traces sampled, times a preselected maximum amplitude to be permitted according to which all the data is scaled so as to fit it all into the proper spacing for the display. In FIG. 6A, a data display scheme is shown which might be useful in connection with data formatted according to the serial by time of detection format shown in FIG. 3. There, the instantaneous values of all the traces are being printed simultaneously, as would be readily possible with the data stored in the format of FIG. 3. Since no left-to-right overlapping is needed, only a single sample at a time would need to be operated upon. Therefore, all that would need to be done would be to scale the individual data points according to predetermined scale factors selected by the operator when selecting the intratrace spacing, and putting display instructions in a matrix which would need to be but one column wide. The height of the column of the array would need to be equal to N times the intratrace spacing desired, plus twice the maximum amplitude selected. The amount of overlap selected would be a function of the intratrace spacing and the maximum amplitude permitted by the scale factor selected. Thus, for example, if it were desired to allow overlapping of up to four traces, and the traces were to be spaced five lines apart, the maximum amplitude permitted, would be four times five, or 20 lines and the scale factor chosen accordingly.

Figure 6B:
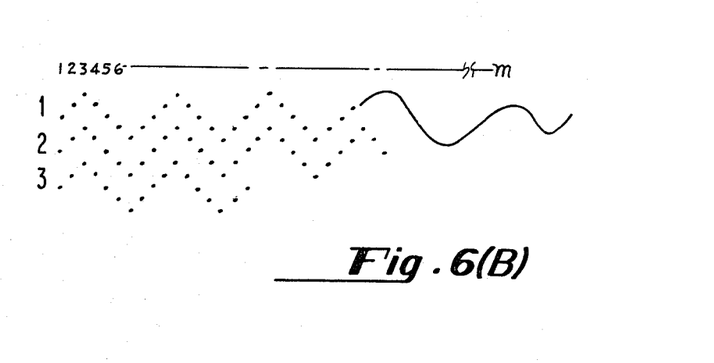

FIG. 6B shows the corresponding representation of the matrix size when it is desired to monitor the recording of data in the channel oriented format of FIG. 4, which is as discussed above in connection with FIGS. 5A through 5C. There M, the width of the array, is set equal to the total number of samples taken in a given shot, whereas N must be equal to a number sufficient to allow the maximum amplitude of each trace being graphed at a given time. That is to say, if the maximum permissible amplitude of the display trace is equal to 20 units, and the traces are to be spaced at intervals of five units, four traces at a time would have to be operated upon so that the display could be output a line at a time. The fact that N, in the example of FIG. 6A being equal to the total number of traces displayed, whereas M is but one, does not correspond to M being equal to the total number of samples, whereas N is equal to more than one in FIG. 6B, is due to the fact that overlapping is only performed in the vertical or N direction, i.e., in FIG. 6B, whereas in FIG. 6A, as far as the printer is concerned, there is no overlap; that is, all traces are operated on at once, one sample at a time, regardless of whether they overlap or not.

Figure 7:
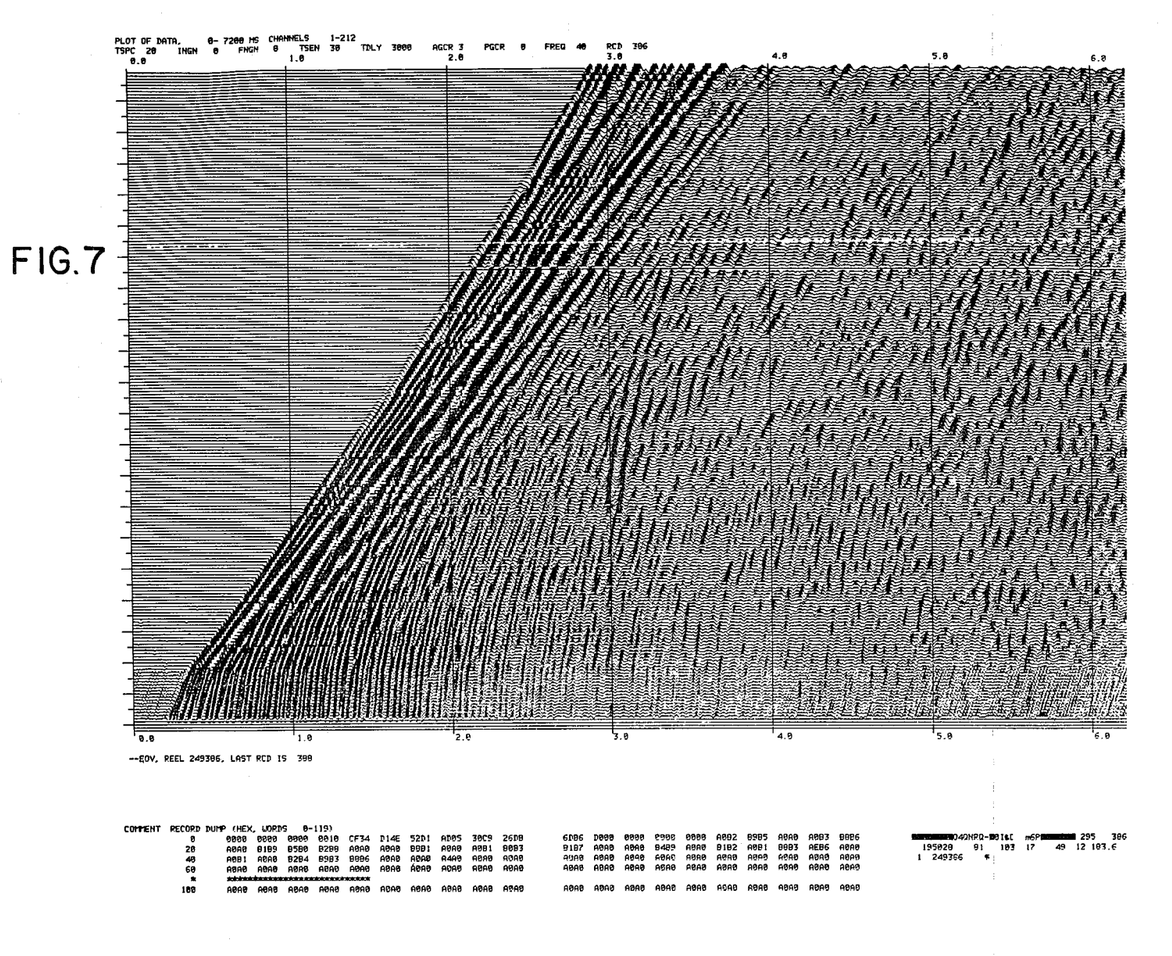
FIG. 7 shows actual display produced by one embodiment of the invention.

An actual output record according to the invention is reproduced as FIG. 7. The data embodied there has been overlapped and filled-in in accordance with the invention. The improvement in legibility accruing from the invention are apparent from FIG. 7.

Figure 8:
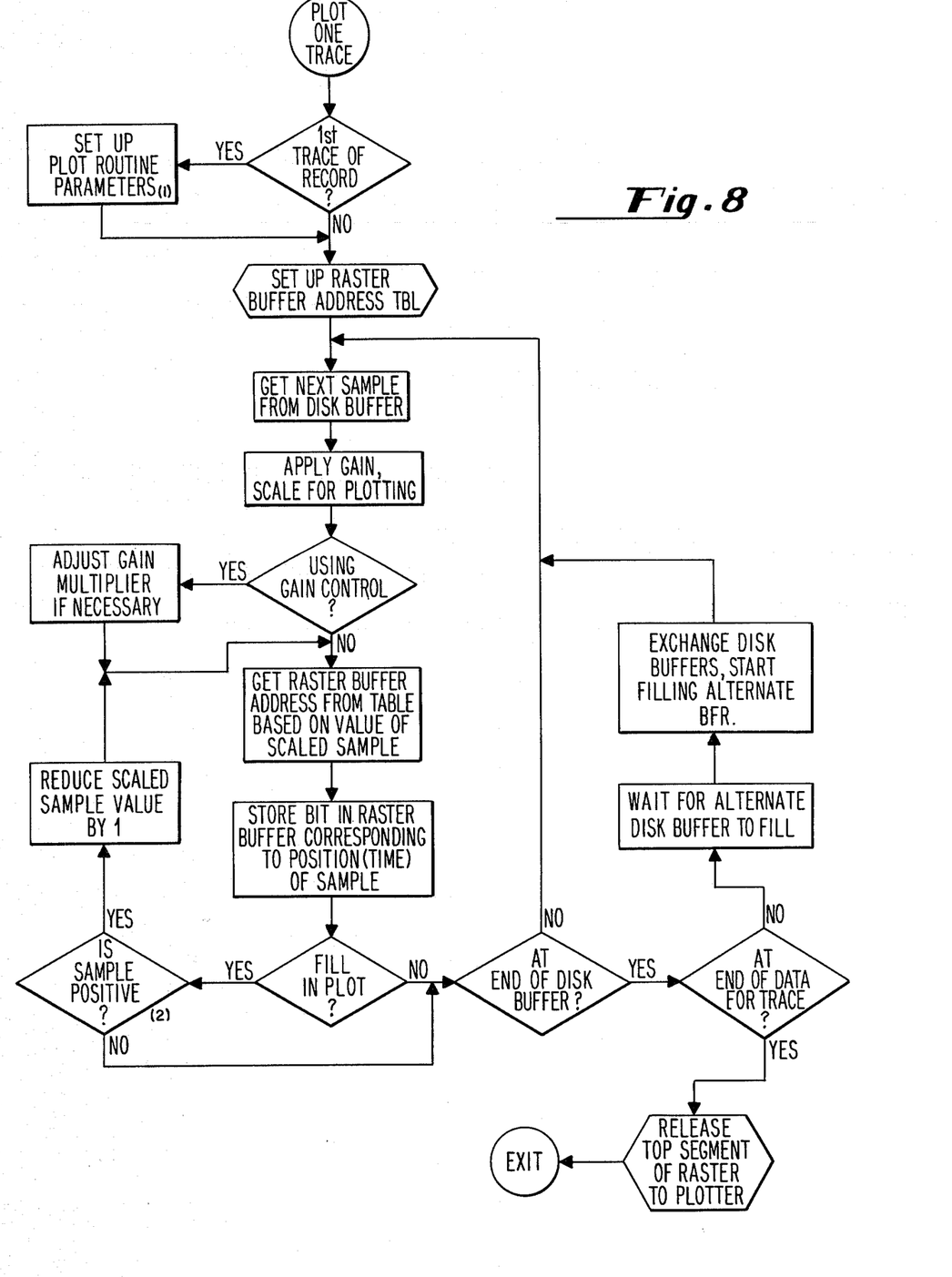
FIG. 8 is a flow chart for the monitor CPU.

FIG. 8 is a flow chart of the method of the invention and may be used to program a digital computer to output print instructions corresponding to the display of FIG. 7. A skilled programmer, given the flow chart of FIG. 8 and the Texas Instruments Model 980 Computer Assembly Language Programmer's Reference Manual and Assembly Language Input/Output Manual, incorporated herein by reference, would have no difficulty practicing the process of the invention.

While a preferred embodiment of the invention has been described, it will be understood by those skilled in the art that many variations on the embodiment shown are possible. It is believed that those skilled in the art will have no difficulty in implementing the real-time monitor of the invention given the above disclosure, and the advantages provided by overlapping and filling-in traces according to the invention will be clearly appreciated by those skilled in the art. Therefore the invention should not be limited by the above description which is merely exemplary, but by the following claims.

We claim:

1. Method of displaying successive traces in the form of an array of points m columns wide, n rows deep, successive traces being displayed overlapped upon one another by a factor of $(n-1)/p$ rows, made up of bytes of digital data comprising the steps of:
   (a) providing an array n rows deep by m columns wide, m being at least equal to the number of digital data bytes making up each of said traces;
   (b) scaling the bytes of each trace such that the maximum scaled value is equal to $(n-1)/2$;
   (c) placing display instructions into said array in accordance with said scaled values, such that zero-valued bytes are written as a display instruction in row $(n+1)/2$, maximum scaled bytes are written in row n, and minimum-scaled bytes are written in row 1;
   (d) operating a display in accordance with the contents of rows n through $(p-1)(n-1)/p$ where p equals the inverse of the desired fractional overlap;
   (e) moving the remaining contents of said array upward by an amount of rows equal to $(n-1)/p$; and
   (f) repeating said steps b-f upon the bytes of the next said trace;
   whereby the displayed traces are overlapped by a number of rows equal to $(n-1)/p$, thus enabling more ready visual analysis of trends in said data.

2. The method as recited in claim 1 wherein step (c) further comprises the step of placing display instructions into said array in all locations between row $(n+1)/2$ and the row corresponding to the maximum scaled value in each column m.

* * * * *